United States Patent [19]
Perisic

[11] Patent Number: 4,501,963
[45] Date of Patent: Feb. 26, 1985

[54] REVERSING DEVICE FOR ROLLER DOORS
[75] Inventor: Milan Perisic, Woodforde, Australia
[73] Assignee: Automatic Roller Doors, Australia, Pty., Ltd., Adelaide, Australia
[21] Appl. No.: 438,987
[22] Filed: Nov. 3, 1982
[30] Foreign Application Priority Data
  Nov. 3, 1981 [AU] Australia ............................ PF1401
[51] Int. Cl.³ ...................... E05F 3/00; G01D 5/38
[52] U.S. Cl. .................................. 250/231 SE; 49/28
[58] Field of Search ............... 250/231 SE; 324/175; 49/25, 26, 27, 28, 29; 318/280

[56] References Cited
U.S. PATENT DOCUMENTS

| 2,752,150 | 6/1956 | Richmond et al. | 49/28 |
| 3,481,387 | 12/1969 | Purdy | 49/28 |
| 3,719,005 | 3/1973 | Carli | 49/28 |
| 3,886,354 | 5/1975 | Swiden et al. | 324/175 X |
| 3,955,661 | 5/1976 | Popper et al. | 49/28 X |
| 4,365,250 | 12/1982 | Matsuoka et al. | 49/25 X |

FOREIGN PATENT DOCUMENTS

| 2400987 | 4/1975 | Fed. Rep. of Germany | 49/28 |
| 3048989 | 7/1982 | Fed. Rep. of Germany | 49/28 |

Primary Examiner—Edward P. Westin
Attorney, Agent, or Firm—Kanz, Scherback & Timmons

[57] ABSTRACT

Briefly, in this invention, a reversing device comprises a rotational wheel or other device in contact with one face of the curtain, which is caused to rotate upon descent of the curtain, and imparts a series of impulses each of which recommences a timing sequence of a timer at normal descent rate, but upon reduction of descent speed (caused for example by an obstruction), the timer times out its entire period and actuates a timer switch and relay circuit which reverses the motor to raise the curtain.

7 Claims, 5 Drawing Figures

REVERSING DEVICE FOR ROLLER DOORS

This invention relates to a device which can be used to reverse the direction of travel of a roller door.

BACKGROUND OF THE INVENTION

A roller door is usually constructed to have a curtain which is guided by tracks, and descends as the door closes, and ascends as the door opens. In some instances the movement of the curtain is effected by power means, for example a reversible electric motor coupled to rotate the roller on which the curtain rolls. To improve stiffness, flexibility and appearance, the profile of the curtain usually includes a plurality of deformed ribs extending transversely across it.

An accident hazard exists for example with small children in that inadvertent operation of the motor causing the door to descend can make it possible for the whole weight of the curtain to bear down upon a small child, animal or the like, and it is the main object of this invention to provide means which will sense obstruction to downward movement (otherwise than at the termination of the closing action), and having sensed that obstruction, will reverse the motor driving the roller so as to lift the curtain clear thereof. Such an arrangement is required to be effective in greatly reducing accident hazards, particularly to children.

This problem has been recognised previously, and the reader may refer to U.S. Pat. No. 4,342,354 (Levenzon), constituting the closest prior art known to the Applicant herein. However, that patent was directed to a mechanism wherein the motor was carried on a swinging arm and moved in a direction out of gear mesh upon excessive loading being applied. A further object of this invention is to provide a more sensitive device than that disclosed in U.S. Pat. No. 4,342,454.

BRIEF SUMMARY OF THE INVENTION

Briefly, in this invention, a reversing device comprises a rotational wheel or other device in contact with one face of the curtain, which is caused to rotate upon descent of the curtain, and imparts a series of impulses each of which recommences a timing sequence of a timer at normal descent rate, but upon reduction of descent speed (caused for example by an obstruction), the timer times out its entire period and actuates a timer switch and relay circuit which reverses the motor to raise the curtain.

Surprisingly, the device of this invention is very sensitive, and the curtain can be made to reverse upon application of only a few pounds on its lower edge, this being all that is necessary to cause deflection of the curtain such that the rate of wheel rotation is reduced.

More specifically this invention consists of
  rotational means in such engagement with a face of the curtain that descent of the curtain effects rotation thereof,
  electrical impulses means operatively coupled to the rotational means,
  a timer,
  a timer output switch and motor switching circuit,
  and electrical interconnection means between said impulse means, timer, output switch and motor switching circuit, so that said impulse means imparts a series of impulses to the timer upon said rotation of the rotational means, each impulse resetting the timer, but upon reduction of descent speed, said timer times out its entire timing period and actuates the timer output switch, in turn actuating the motor switching circuit to reverse direction of rotation of the motor.

In one embodiment the electrical impulse means comprises a photo-electric cell light and target assembly in an U-shaped configuration which fits over a disc which is gear driven by wheels, the disc containing apertures which successively cause a series of impulses of electrical current to flow from the PE cell to in turn re-initiate the timer.

BRIEF SUMMARY OF THE DRAWINGS

An embodiment of the invention is described hereunder in some detail with reference to and is illustrated in the accompanying drawings, in which.

DESCRIPTION OF THE PREFERRED EMBODIMENT

Figure 1:
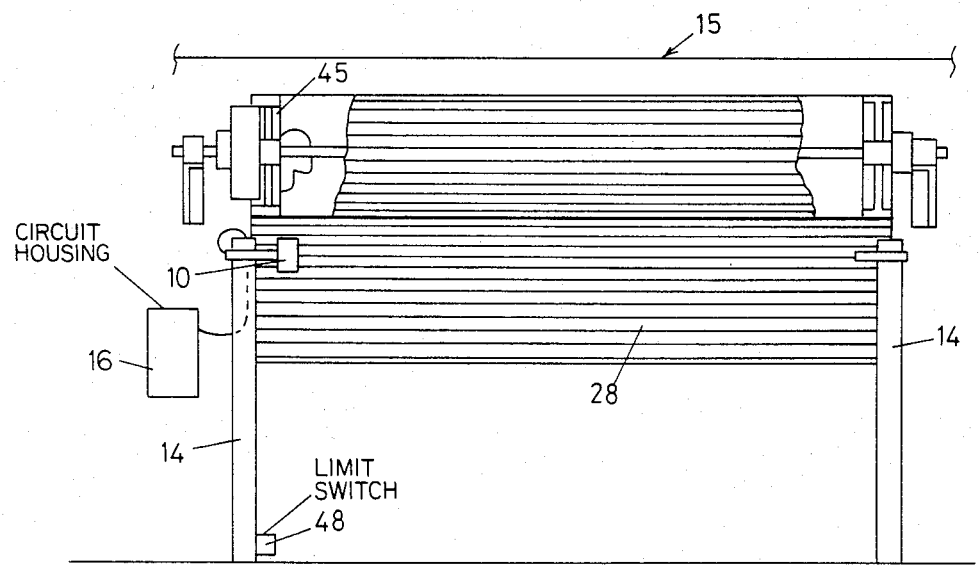
FIG. 1 is an elevation of a roller door incorporating the reversing device of this invention.
Figure 2:
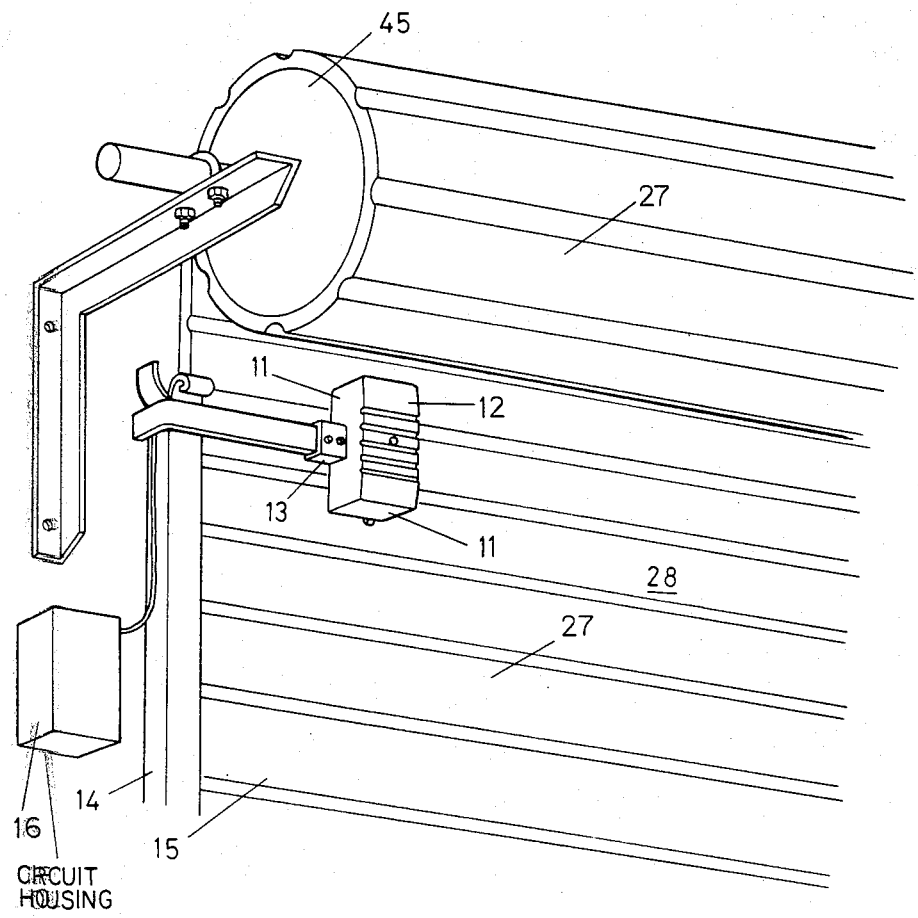
FIG. 2 is a fragmentary perspective view of portion thereof.

In this embodiment a frame 10 comprises four sides 11 in rectangular configuration and a back wall 12, and an apertured sleeve 13 whereby the frame 10 can be secured to a channel track 14 of roller door assembly 15.

Figure 3:
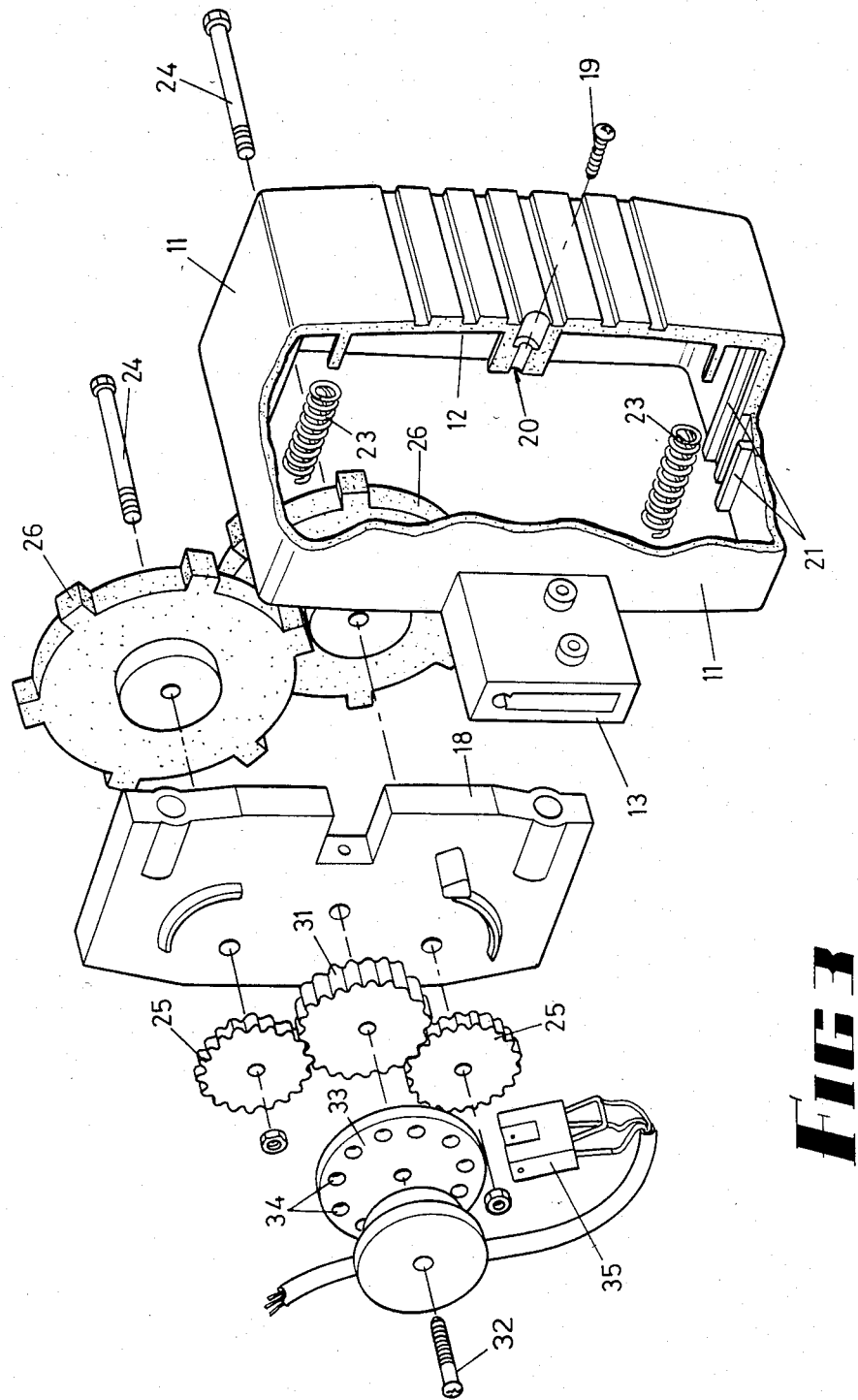
FIG. 3 is an "exploded" view of the rotational and electrical impulse means.
Figure 4:
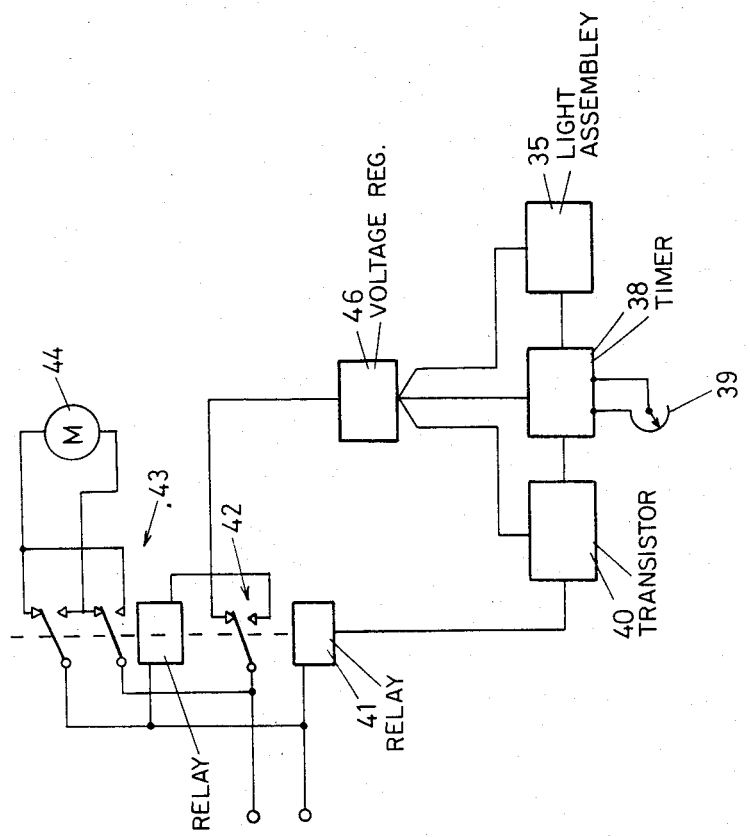
FIG. 4 is a block diagram of the overall electrical circuit.

The frame 10 carries in it a slidable sub-frame 18 (FIG. 3), the slidable sub-frame 18 being retained in frame 10 by a screw-threaded pin 19 which is itself movable through an aperture 20 in the back wall 12 on the frame 10, and is guided along its edges by guides 21 in upper and lower sides 11. The slidable sub-frame 18 is urged in an outwards direction by means of a pair of compression springs 23, and carries on it a pair of axles 24 each of which has gears 25 at one end and fluted wheels 26 at the other end. The fluted wheels are arranged to be engaged by successive ribs 27 on the door curtain 28 as the door moves upwardly or downwardly.

The gears 25 on the shafts 24 are interconnected by an idler gear 31 carried on a short stub axle 32 on slidable sub-frame 18, and the idler gear ensures that rotation of one fluted wheel causes identical rotation of the other, thereby ensuring continuous, or almost continuous rotation of the idler gear. The idler gear 31 is directly coupled to an apertured disc 33. The disc 33 contains a plurality of apertures 34 equally spaced around it in a circumferential direction on a pitch circle near its periphery, and these apertures pass light from an illuminating light source to a PE cell of a light assembly 35 of U-shaped configuration. Thus as the door curtain moves towards its closing position, the PE cell will produce a succession of impulses. Some adjustment for pitch of the ribs can be achieved by repositioning the gears 25 with respect to one another.

The PE cell is in turn wired to a timer, generally designated 38, and comprising a retriggerable monostable multivibrator, arranged so that each impulse re-initiates the timer. A potentiometer 39 adjusts the full timer period. In the event that the next impulse does not occur until after the timer has timed out its full period, the timer will change its state so that a timer output switch (transistor 40) conducts and energises relay 41 to close contacts 42, and this in turn operates the reversing relay 43 for the motor 44 which drives the roller 45 carrying the curtain 28. A voltage regulator circuit 46 ensures a constant operation. Thus if an obstruction exists in the door opening space as the door curtain is closing, the obstruction will inhibit downward movement of the door curtain and this will allow the timer to time out its full period, whereupon the motor reverses and the door is raised away from the obstruction, thus reducing the hazard which can otherwise occur owing to continued downward motion of the curtain being allowed by the rotation of the driving motor.

Secured to the channel track 14, near either its upper or lower end, there is provided a small limit switch 48, or microswitch, which open circuits to cut off power at the end of downward travel, and set a relay (not shown) such that the device does not function on upward travel.

Figure 5:
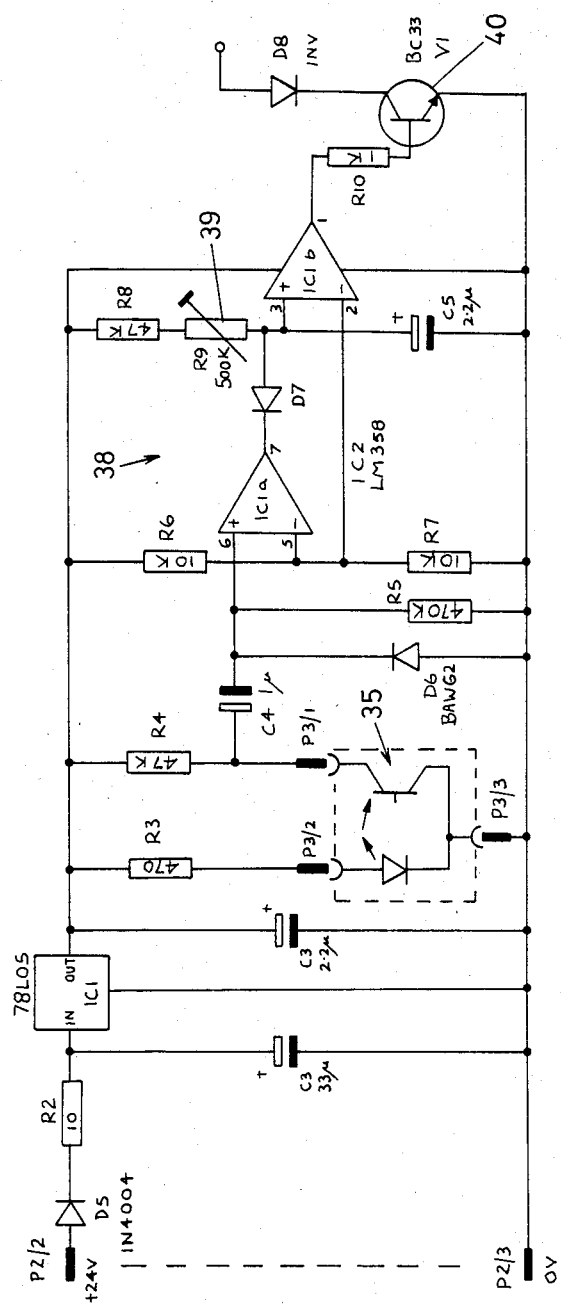
FIG. 5 is an electrical circuit of the impulse means, timer and timer output switch.

The following is a detailed description of the circuit operation (FIG. 5):

As the curtain descends, the reversing relay is activated causing +24 volts to be supplied to the timing circuit FIG. 5.

The +24 volts is regulated to +5 volts by IC1 in conjunction with filter capacitors C2 and C3.

The following is the operation of the circuit contained within housing 16 with the light assembly 35 not connected. At the instant power is supplied, capacitor C4 begins charging via resistors R4 and R5. Initially C4 appears as a short circuit allowing almost all the +5 volts to appear at pin 6 of IC1a. Pin 5 of IC1a is connected to the voltage divider R6 and R7, which acts as a 2.5 volt reference. Therefore IC1a, which is acting as a comparator, changes its output state from 0 volts to +5 volts. The diode D7 is then reverse biassed and capacitor C5 begins to charge via rheostat 39 and resistor R8. Once C5 charges to a voltage in excess of 2.5 volts, IC1b charges its output state from 0 volts to +5 volts. This in turn biases on transistor 40 which activates the motor reverse relay circuits.

In the meantime C4 has continued charging and once the voltage on pin 6 of IC1a falls below 2.5 volts, IC1a changes output state on pin 7 from +5 volts to 0 volts. Diode D7 is then forward biassed and C5 is discharged via IC1a which acts as a current sink. IC1b then changes output state from +5 volts to 0 volts and transistor 40 and subsequent relay circuits are deactivated.

Now with the light assembly in the circuit, and assuming the curtain is travelling at appropriate speed, the capacitor C4 is being continually discharged via the phototransistor and diode D6. Thus C4 never has a chance to charge up to a sufficient voltage to subsequently activate the relay drive transistor 40. If the speed is reduced, there is an increased period of charge, so that only then does C4 attain across it sufficient voltage to function as described above, as if the light assembly 35 were not connected.

Although the device has been described as using a single mounting screw recessed into the box, it can be modified to use two mounting screws with respective springs.

It will of course be seen that the invention can be varied in many ways. For example the impulses can be received by the closing of contacts in turn effected by an arm or cam outstanding from the sub-frame assembly. This could for example actuate a micro-switch in lieu of the PE cell and light assembly. Although the slidable sub-frame has been described as being spring-loaded outwardly, in some embodiments of the invention this facility if not deemed necessary and the sub-frame can itself be secured to the frame. The circuit described herein included mechanical relays in the motor switching circuit, but these can be replaced by an equivalent solid state switching circuit, using for example S.C.R.'s or Triacs. However these and other similar variations will be seen to lie within the invention.

I claim:

1. A reversing device for use with a roller door of the kind having a sheet metal curtain carried on an overhead roller driven by a reversible motor, and guided for vertical movement by tracks engaging its edges, which said device, when installed on such a door, comprises:
   rotational means in such engagement with a face of the curtain that descent of the curtain effects rotation thereof,
   electrical impulse means operatively coupled to the rotational means,
   a timer,
   a timer output switch and motor switching circuit,
   and electrical interconnection means between said impulse means, timer, output switch and motor switching circuit, so that said impulse means imparts a series of impulses to the timer upon said rotation of the rotational means, each impulse resetting the timer, but upon reduction of descent speed, said timer times out its entire timing period and actuates the timer and output switch, in turn actuating the motor switching circuit to reverse direction of rotation of the motor.

2. A reversing device according to claim 1 wherein said curtain has a plurality of stiffening ribs extending across it, and wherein said rotational means comprises a wheel having flutes in its periphery which are successively engaged by said ribs upon said curtain descent.

3. A reversing device according to claim 1 wherein said curtain has a plurality of stiffening ribs extending across it, and wherein said rotational means comprise a pair of wheels on corresponding ends of a pair of parallel axles spaced from one another, each said wheel having flutes in its periphery which are successively engaged by said ribs upon said curtain descent,
   a pair of gears on the other corresponding ends of said axles, and
   an idler gear meshing with said pair of gears.

4. A reversing device according to claim 3 wherein said electrical impulse means comprises a disc coupled to one of said gears to be rotational therewith, said disc having a plurality of apertures extending around a pitch circle, and a photo-electric cell and light assembly straddling said disc.

5. A reversing device for use with a roller door of the kind having a sheet metal curtain carried on an overhead roller driven by a reversible motor, and guided for vertical movement by tracks engaging its edges, which said device, when installed on such a door, comprises:
   a box set frame having sides and a back wall,
   mounting means securing said frame to said track,
   guide means in two of the sides of said frame and a slidable sub-frame guided for movement by said guide means and having springs interposed between said back wall and sub-frame urging said sub-frame towards said curtain,
   a pair of spaced parallel axles journalled for rotation in said sub-frame and each having a wheel on one end and a gear on the other end, a third axle carried by the sub-frame and an idler gear in mesh with the other said gears and rotatable about the third axle, a disc carried by said gear and having a plurality of apertures therethrough extending around a pitch circle, a U-shaped photo-electric cell and light assembly straddling said disc and located with respect thereto such that a light transmits energy to the photo-electric cell only when a said disc aperture is located between the light and cell, a timer, a timer output switch and motor switching circuit, and electrical interconnection means between said photo-electric cell, timer output switch and motor switching circuit so interconnecting those elements that electrical impulses transmitted by the photo-electric cell upon rotation of the disc sequentially resets the timer, but reduction of speed of disc rotation allows said timer to time out its entire timing period and thereupon to actuate the timer output switch, in turn actuating the motor switching circuit to reverse direction of rotation of the motor.

6. A reversing device according to claim 5 wherein said sheet metal curtain has a plurality of stiffening ribs extending across it, and each said wheel has flutes in its periphery which are successively engaged by said ribs upon said curtain descent.

7. A reversing device according to claim 5 or claim 6 further comprising a limit switch on one of said tracks and engageable by said curtain at the end of its descent, said limit switch being portion of said electrical interconnection means to open said circuit and thereby cut off power at the end of said descent and also to set a relay such that the device does not function on ascent.

* * * * *